E. A. ARCHIBALD.
Vehicle Wheel.
No. 106,449.
Patented Aug. 16, 1870.
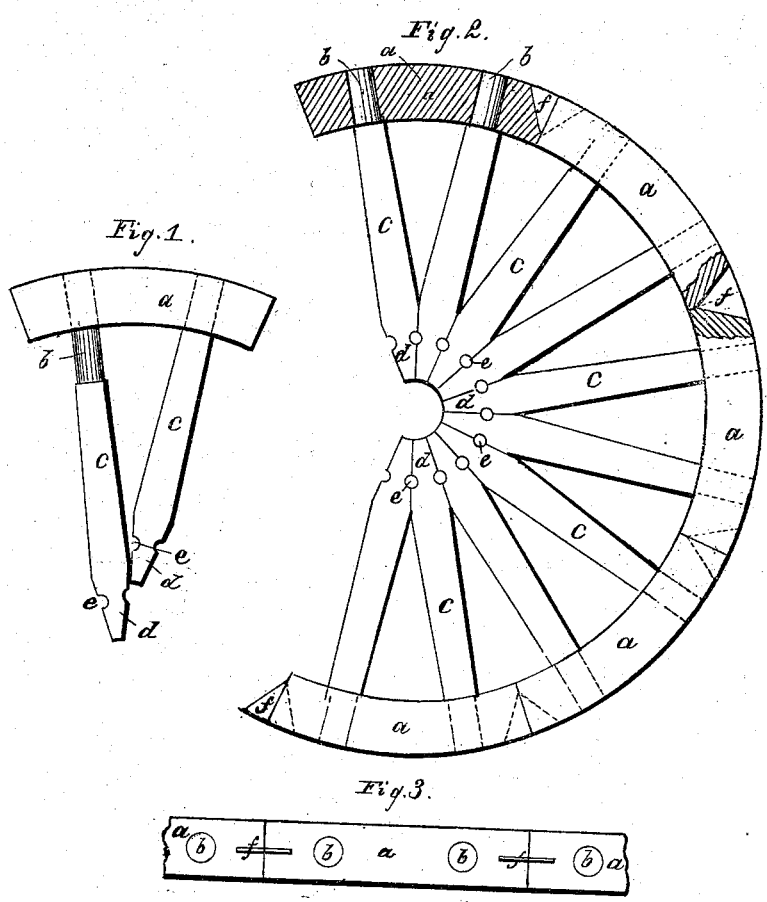

UNITED STATES PATENT OFFICE.

EDWARD A. ARCHIBALD, OF METHUEN, MASSACHUSETTS.

IMPROVEMENT IN THE MANUFACTURE OF WHEELS.

Specification forming part of Letters Patent No. 106,449, dated August 16, 1870.

*To all whom it may concern:*

Be it known that I, EDWARD A. ARCHIBALD, of Methuen, in the county of Essex and State of Massachusetts, have invented an Improvement in the Manufacture of Wheels; and I do hereby declare that the following, taken in connection with the drawing which accompanies and forms part of this specification, is a description of my invention sufficient to enable those skilled in the art to practice it.

This invention relates to the manufacture of that class of wheels in which the hub ends of the spokes are confined between hub-plates, one of which is integral with the axle-box, the other being loose with respect to said box. The sides of the hub ends of the spokes in such wheels are made in true radial planes of the wheels, and occupy the entire space between the plates and the axle-box. Said hub ends differ in shape from the hub ends of wheels which are driven into mortises in the hubs, for in such wheels the sides of the hub end of each spoke are parallel. In this class of wheels, to which my invention specially relates, and in fact in all wheels used for vehicles where wood is employed for the spokes and fellies, the process of manufacture has involved the assembling of all the spokes with the hub, and then the parts of the felly have been driven upon the tenons formed on the outer ends of the spokes, said tenons standing normally in radial directions from the hub, and the tenon-holes in the felly-pieces being bored in radial directions toward the center of the circle of which they are segments.

It will readily be seen that, as the spokes are assembled and confined to the hub, the distances apart of their centers at their outer ends is greater than the distances apart of the centers of the tenon-holes in the felly-pieces at the inside boundary thereof, so that, in driving the felly upon the spoke-tenons, the spokes and tenons have to be sprung out of their normal position, and, to lessen the strain thus brought upon the spokes and fellies, it is not uncommon to make the tenons taper with the smallest end outermost, or the tenon-holes conical with the largest end outermost, and then to make a partial fit between the tenon and tenon-hole the tenon is split and wedged.

In my present invention I form the spokes and felly-pieces with exactness, and have the hub ends of the spokes all of the same size and shape, with two sides of each in radial planes of the wheel.

The shoulder of the tenon of each spoke is made exactly the same distance from its hub end with every other spoke in the wheel, and all the tenons are of the same length and size. Each part of the felly is of the same length and width with every other part, and the ends of each part are in true radial planes of the wheel, and the curvilinear boundaries of each part are concentric with the axis of the wheel, said boundaries being formed correctly as to their radii, and the tenon-holes in the felly parts are correctly spaced and are bored of uniform diameter in true radial directions.

Usually there are but two spokes in each piece of the felly, in which case, in my invention, one spoke has its tenon driven up to its shoulder into one of the tenon-holes made in the felly-piece. This spoke and tenon, of course, drives in a true radial direction without springing; but when the next spoke is driven the contact of the hub ends does not permit its movement without some springing of the wood both of said spoke and its tenon and the previously-driven spoke, which springing is, however, slight as compared to that produced by the old proceeding of driving the felly upon the spokes, which proceeding I reverse in my invention. As the second spoke is driven and approaches its ultimate position the springing grows less, and disappears when the shoulder of the second spoke reaches the inner boundary of the felly, for then the radial planes of the spoke ends reach their normal position. During the driving I confine the felly-piece in a suitable clamp or vise arranged with guides for the spoke, by which the felly is held from splitting and the spoke from twisting during its movement. When the spokes have been driven into all of the felly-pieces needed for one wheel they are brought together in and by the action of the machine described in the Patent No. 98,331, granted to me December 28, 1869; and, as the hub ends of the spokes are brought together and compressed, the fellies are firmly settled upon the tenons, and the shoulders of the spokes somewhat embedded into the wood of the fellies. Before driving the spokes into the fellies I saw a kerf into each felly end for reception of pieces, which take the place of the dowel-pins usually employed. In said kerfs I insert pieces of thin bar-iron cut into equilateral triangles.

In the drawing, Figure 1 represents one piece of a felly with one spoke driven therein and with another entered ready to be driven to assume its proper position. Fig. 2 shows, in elevation and in partial section, a large portion of a wheel in which the fellies and spokes have been pressed by the machine before referred to until the ends of the fellies have been brought together, at which time the half-round grooves formed in the radial planes of the hub ends of the spokes and at uniform distances from the spoke ends correspond, so as to make round holes to receive the bolts which confine the hub-plates together, clamping the spokes, the bolts also serving as keys to prevent one spoke from drawing outward beyond another. Fig. 3 shows a plan of a portion of the felly of the wheel, exhibiting the dowel-pieces and the spoke-tenon ends.

$a$ represents each piece of the felly; $b$, the tenon of each spoke; $c$, the arm of each spoke; $d$, the hub or nave end of each spoke; $e$, the holes formed for the hub-plate bolts by the coincidence of the half-round grooves cut across the radial faces of the hub ends $d$; and $f$ are the dowels, set in saw-kerfs formed in the felly ends.

The hub and hub-plates are not shown in the drawing, as there is nothing novel about them or their application in this connection.

After the felly-segments and their attached spokes are submitted to the action of the patented machine before referred to, and the spokes confined by the bolts passing through the hub-plates and the spoke ends, then when the wheel is released from the machine the elasticity of the wood in the felly will cause the end joints of the fellies to slightly open, but to no greater extent than a slight shrinkage of the tire will easily close up.

In constructing wheels as described I am enabled to reduce the size of the tenons considerably below the sizes heretofore considered necessary, by which reduction the tenon-holes are lessened in size, and consequently the fellies are left stronger than heretofore.

The tenons fit along their whole length in the tenon-holes, and need no wedging, and the shoulders, at the junction of the tenons with the arms of the spokes, are bedded and fitted to the wood of the felly so perfectly and to such an extent that they are not liable to embed farther into the felly in actual wear.

Having described the practice of my invention, I would now state that it consists in the process of manufacture in which the fitted spokes are driven into fitted fellies, and then the united spokes and fellies are assembled, compressed together, and the nave ends of the spokes secured between hub-plates, substantially as described.

I claim—

The described process in the manufacture of wheels.

EDWD. A. ARCHIBALD.

Witnesses:
CHAS. A. GOLDSMITH,
SAMUEL G. SARGENT.